Feb. 16, 1954  W. J. BRETH  2,669,281
METHOD OF FOLDING THE ENDS OF A FABRIC BAND OVER
THE END SHOULDERS OF A TIRE BUILDING DRUM
Original Filed June 14, 1944  4 Sheets-Sheet 3
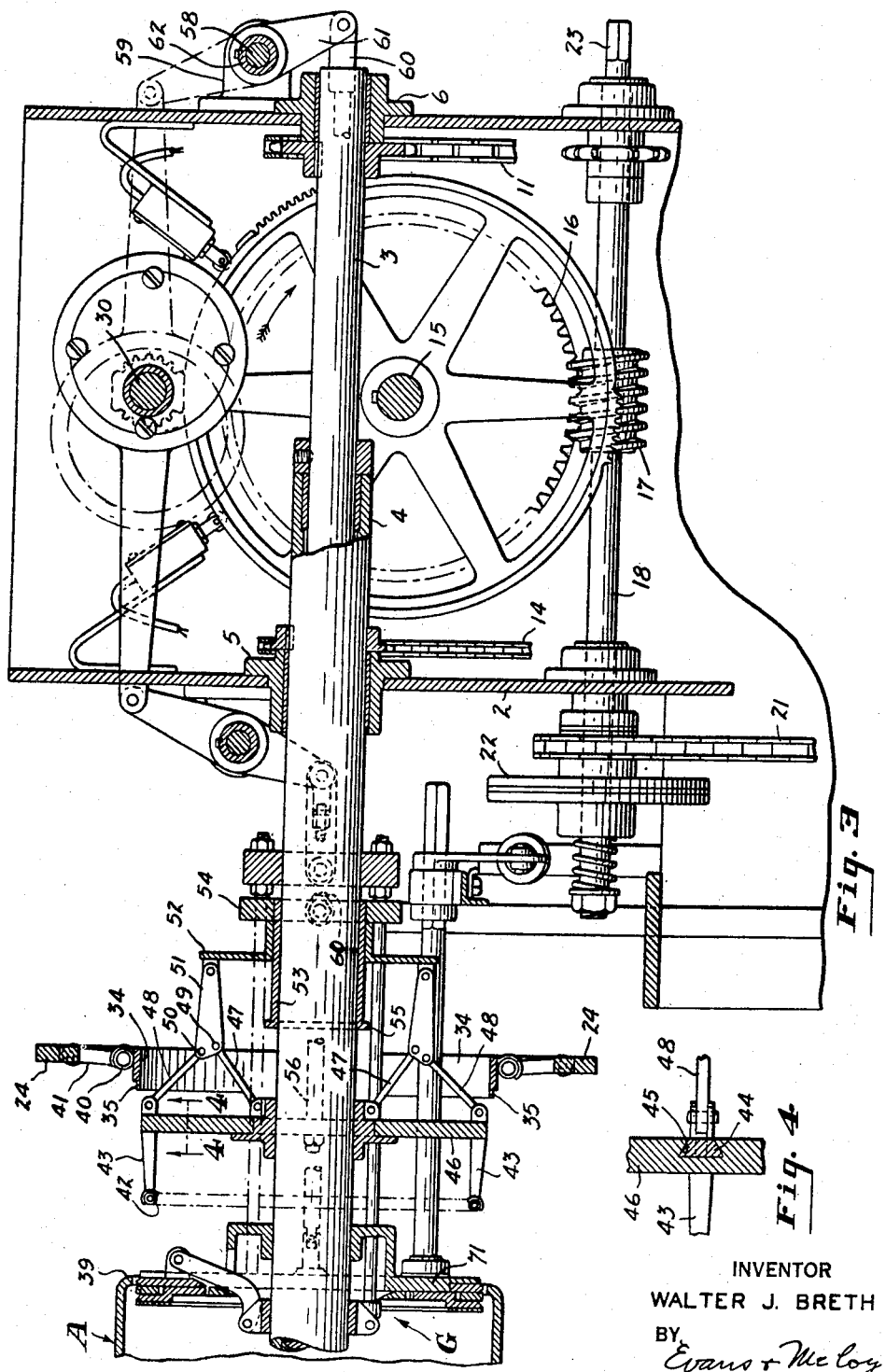
INVENTOR
WALTER J. BRETH
BY
Evans + McCoy
ATTORNEYS Feb. 16, 1954 W. J. BRETH 2,669,281
METHOD OF FOLDING THE ENDS OF A FABRIC BAND OVER
THE END SHOULDERS OF A TIRE BUILDING DRUM
Original Filed June 14, 1944 4 Sheets-Sheet 4

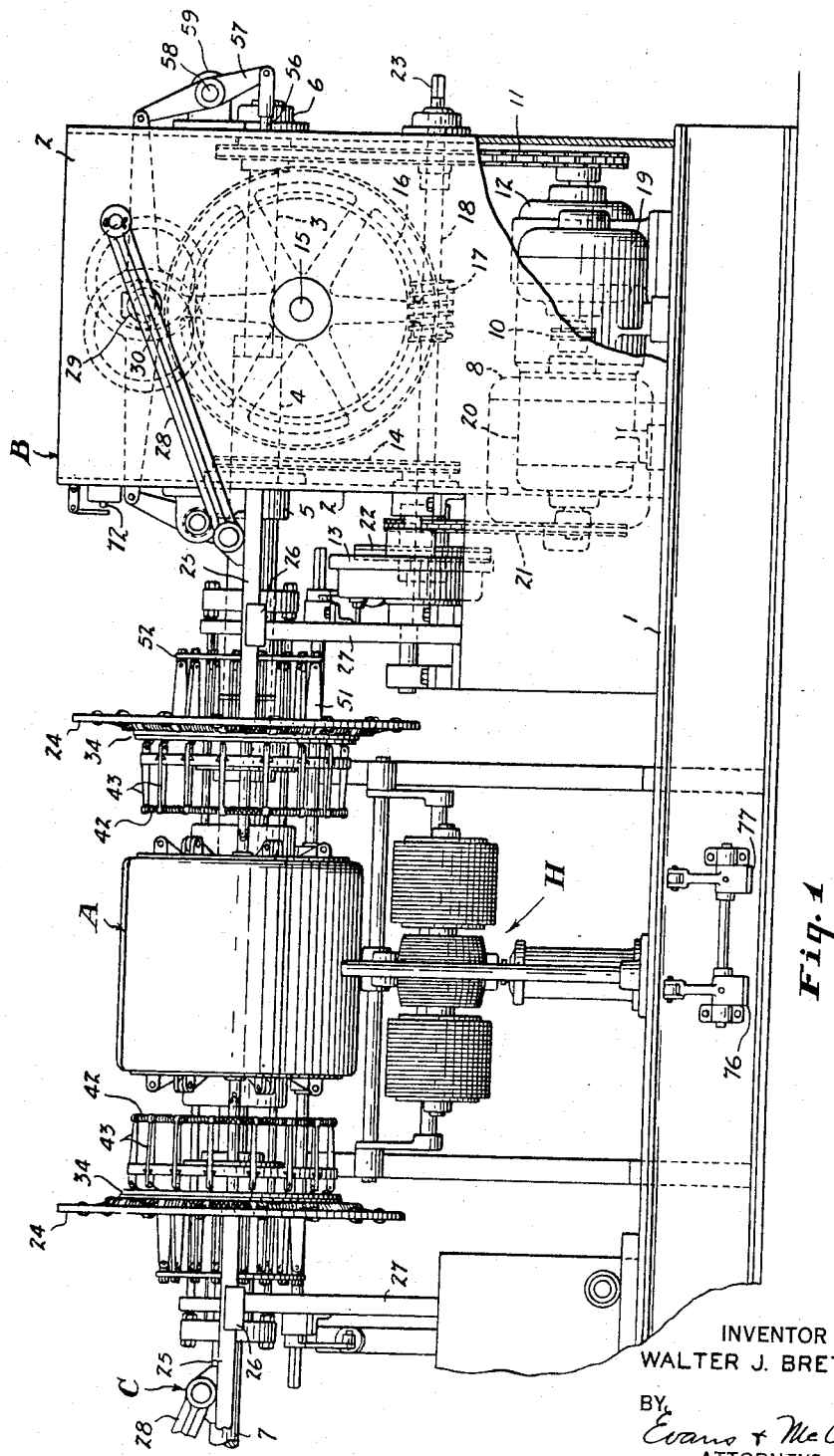

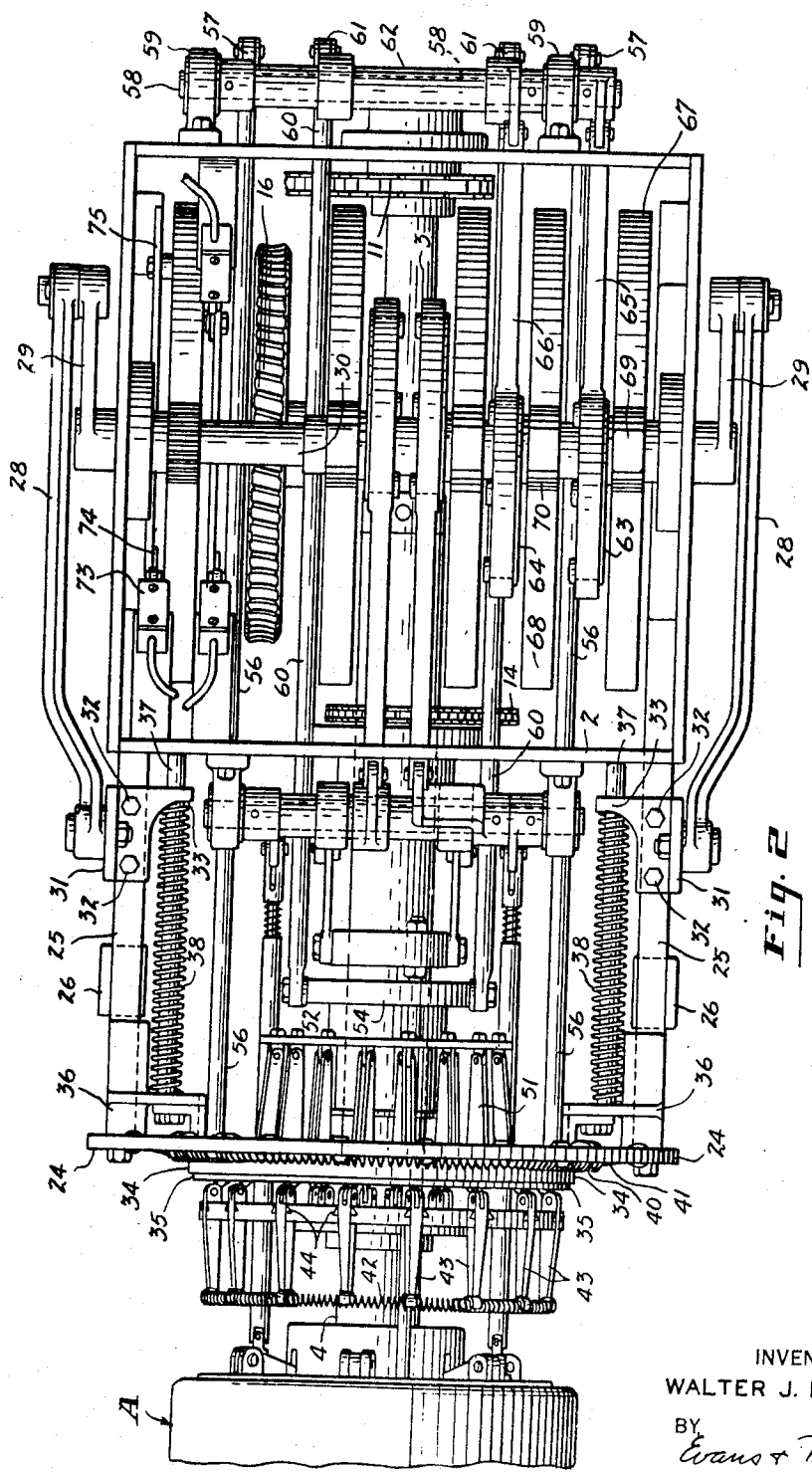

INVENTOR
WALTER J. BRETH
BY Evans + McCoy
ATTORNEYS

Patented Feb. 16, 1954

2,669,281

UNITED STATES PATENT OFFICE 2,669,281

METHOD OF FOLDING THE ENDS OF A FABRIC BAND OVER THE END SHOULDERS OF A TIRE BUILDING DRUM

Walter J. Breth, Akron, Ohio, assignor to The General Tire & Rubber Company, Akron, Ohio, a corporation of Ohio Original application June 14, 1944, Serial No. 540,306, now Patent No. 2,455,038, dated November 30, 1948. Divided and this application January 13, 1951, Serial No. 205,901

2 Claims. (Cl. 154—14)

This invention relates to a method of folding the ends of a fabric band radially inwardly over the end shoulders of a tire building drum, and is a division of my copending application Serial No. 540,306, filed June 14, 1944, now Patent No. 2,455,038, issued November 30, 1948.

The method of the present invention is directed to the folding of the ends of a tube of fabric formed on a tire building drum and projecting radially beyond an end of the drum to provide an inwardly extending fabric flange to which a tire bead may be applied. The end of the tube projecting beyond the end of the drum upon which the tube is placed is folded inwardly without application of pressure to any portion thereof that is in engagement with the drum by positioning a ring of fabric engaging elements around the projecting end of the drum and beyond the end of the drum and then moving the engaging elements simultaneously radially inwardly past the end of the drum along lines spaced outwardly from the end of the drum to contract the tube end while leaving the portion of the tube overlying the end of the drum free to accommodate itself to the shrinkage of the fabric so that the bead receiving fabric flange overlying the end of the drum is substantially free from wrinkles.

Reference should be had to the accompanying drawings forming a part of this specification, in which:

Figure 1 is a side elevation of a tire building machine in which the invention is embodied;

Fig. 2 is a top plan view of one end of the machine;

Fig. 3 is a vertical axial section through the mechanism shown in Fig. 2;

Figure 5:
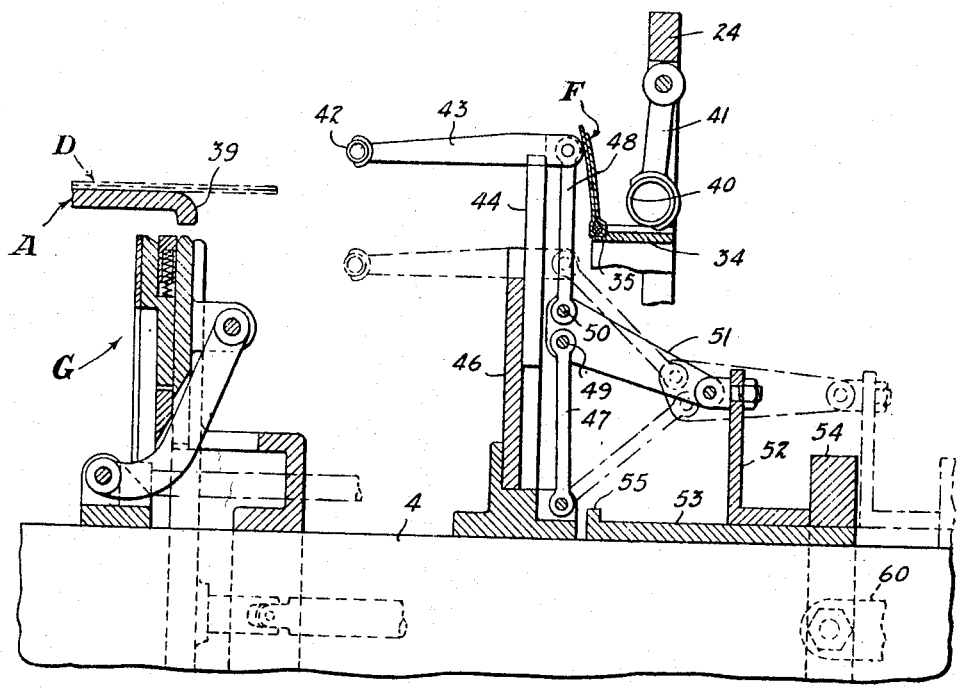
Figure 6:
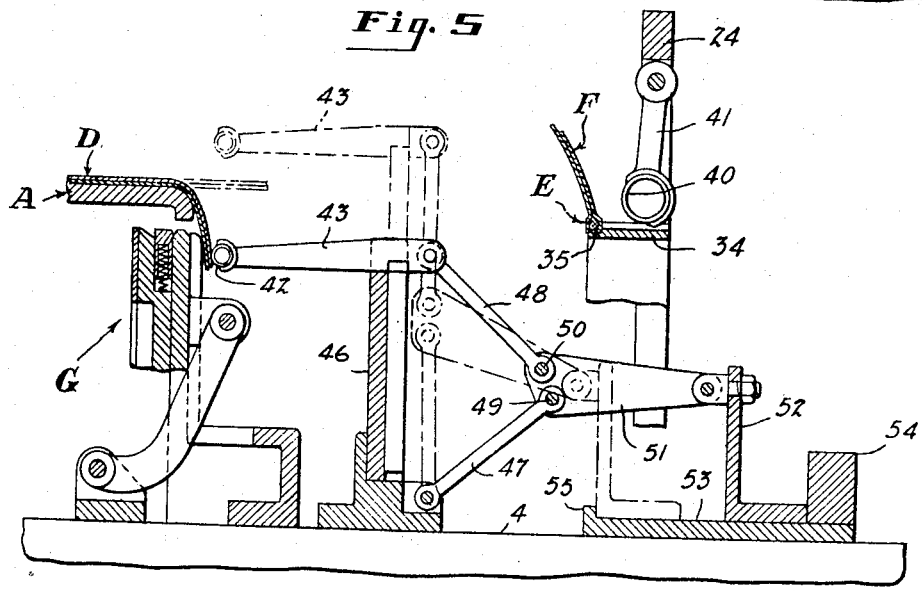

Fig. 4 is a fragmentary section taken on the line indicated at 4—4 in Fig. 3; and Figs. 5 and 6 are fragmentary, vertical, axial sections on an enlarged scale, illustrating the operation of a folding device that can be used advantageously in practicing the method of the present invention. Fig. 5 shows in dotted lines the original retracted and contracted position of the fabric folding ring, and in full lines shows the ring expanded to a diameter greater than that of the drum. Fig. 6 shows the fabric folding ring in dotted lines moved axially inwardly from the position shown in Fig. 5 to a position overlying the projecting edge of the fabric band D, and in full lines shows the ring contracted and the fabric folded over the end of the drum.

The tire building machine in which the flange forming device has been employed consists of a centrally disposed, collapsible tire building drum A which may be of the usual and conventional construction, a stationary bead building head B and a movable bead building head C, which serve to apply the bead rings to fabric at the ends of the drum and to shape the bead portions of the tire, the arrangement being similar to that disclosed in my Patent No. 2,313,035, granted March 9, 1943. Since the mechanisms on the two heads B and C are identical, except for certain details of the operating and control devices, the mechanism of the stationary head B is illustrated (completely) herein, while only enough of the head C is shown to make clear the operative relationship.

The machine is mounted upon an elongated base 1, upon which the head B and the drum A are mounted in fixed positions, and upon which the head C is slidably supported for movement axially toward and away from the drum A. The actuating and control mechanism of the head B is mounted within a housing 2 having vertical inner and outer and side walls. The drum A, which is composed of collapsible segments, is supported on a shaft 3 and a sleeve 4 on the shaft 3, the segments of the drum being connected by suitable links to the sleeve and shaft so as to be expanded or collapsed by relative rotary movements of the sleeve and shaft. Since this construction is conventional for tire building drums, the linkage is not herein illustrated.

The supporting shaft 3 is mounted in bearings 5 and 6 in the inner and outer walls of the housing 2, and has interfitting engagement with an axially aligned shaft 7 on the movable head C. The shaft 3 is driven by an electric motor 8 mounted on the base 1, the shaft 3 being connected to the motor 8 through sprocket chains 10 and 11 and an interposed reduction gearing in a housing 12, the reduction gearing being driven by the motor through the chain 10 and the shaft 3 being driven from the reduction gearing through the chain 11. In order to cause relative rotation of the shaft 3 and sleeve 4 to collapse the drum, an air brake 13 is connected by a sprocket chain 14 to the sleeve 4. Upon application of the brake 13, the sleeve 4 is held against rotation, whereupon continued rotation of shaft 3 in one direction or the other will expand or collapse the drum.

A transverse actuating shaft 15 is journaled in the side walls of the housing 2, and this shaft has a worm wheel 16 attached thereto that meshes with a worm 17 on a longitudinal shaft 18 journaled in the inner and outer walls of the housing. The moving parts of the bead building head are actuated by the shaft 15, which is driven by an electric motor 19 through reduction gearing in a housing 20 and a sprocket chain 21 extending to the shaft 18.

The moving parts of the bead building head B are actuated by the shaft 15 and it is desirable that the rotation of this shaft be stopped upon excessive resistance to movement of any of these parts. The shaft 18 is, therefore, driven through a slip clutch 22 interposed between the sprocket chain 21 and the shaft 15. The shaft 18 preferably projects through the outer wall of the housing 2 and has a squared end 23 adapted to receive a hand crank by which the shaft may be turned manually to adjust the moving parts when desired.

The bead ring applying and bead forming instrumentalities of each of the bead building heads are annular members which engage with the bead ring and fabric throughout the circumference thereof. These annular members are coaxial with and surround the shaft 3 and are mounted for axial movements with respect to the drum. An annulus 24 is carried by axially extending square bars 25 which, as best shown in Fig. 2 are slidably mounted in the housing 2 and upon guides 26 at the upper ends of posts 27, as shown in Fig. 1. Axial movements are imparted to the supporting bars 25 and the annulus 24 by means of connecting rods 28 that are pivotally connected to the bars 25 and to cranks 29 on the ends of a transverse shaft 30 mounted in the housing 2 above the shaft 15. The rods 28 are connected to brackets 31 attached to the tops of the bars 25 by bolts 32, the brackets 31 being provided with flanges 33 that project inwardly past the inner sides of the bars 25.

As shown in Fig. 3, a bead ring supporting annulus 34 is mounted for movement within the annulus 24 and is provided along its inner edge with a rabbeted bead ring seat 35. As shown in Fig. 2, supporting brackets 36 attached to the bead ring annulus 34 are slidable upon the bars 25 and carry rods 37 that extend along the inner sides of the bar 25 and slide in apertures in the flanges 33 of the brackets 31. Coil springs 38 surrounding the rods 37 are interposed between the brackets 31 and 36 and normally cause the bead supporting annulus to travel with the annulus 24. However, when the inward movement of the bead supporting annulus is impeded, the springs 38 will yield and permit the annulus 24 to advance beyond the annulus 34. In applying the bead ring the inward movement of the annulus 34 is stopped when the head ring is pressed against an inwardly projecting bead positioning flange 39 on the end of the drum and the bead ring is held against the flange 39 with an increasing pressure as the annulus 24 is advanced over the end of the drum and the springs 38 are compressed. The annulus 24 carries a smoothing ring 40 in the form of an endless coil spring, which is normally of a diameter less than that of the drum, but which is adapted to be expanded to conform to the periphery of the drum upon movement over the drum shoulder. The ring 40 is supported by a series of circumferentially spaced, radially disposed links 41 that are pivoted at their outer ends to the interior of the annulus 24 to swing axially. The ring 40 serves to press down portions of the fabric overlying the shoulder portion of the drum. The springs 38 are of considerable length so that the movement of the annulus 24 over the end of the drum does not cause an excessive pressure to be exerted upon the bead by the annulus 34.

By the method of the present invention the ends of a fabric band projecting past the ends of the drum are folded radially inwardly simultaneously throughout the circumference of the drum and the fabric folding device of the present invention is particularly designed to advantageously cooperate with the bead applying mechanism.

For folding the end edges of a band of fabric on the drum inwardly over the shoulders of the drum, each head is provided with a contractible endless coil spring folder ring 42 that is adapted to be expanded to a diameter greater than that of the drum, and to be placed over an end portion of a fabric band that projects beyond the end of the drum and then contracted to fold the fabric inwardly over the drum shoulder. The contractible endless coil spring ring 42 is carried by axially extending arms 43 that are rigidly attached to the outer ends of radial bars 44 that are slidably mounted in radially disposed dovetail slots 45 in the outer face of a disk 46 that is slidably mounted on the sleeve 4. Suitable means is provided for simultaneously imparting radial outward movements to the ring supporting arms 43 to expand the ring 42 to a diameter greater than that of the drum. This movement is accomplished by means of a series of identical toggles, each consisting of an inner radially disposed link 47 pivoted to the hub of the disk 46 and an outer radially disposed link 48 pivoted to the outer end of one of the arms 43. The toggle links 47 and 48 are connected at their outer and inner ends, respectively, by pivots 49 and 50 to the inner ends of elongated axially extending actuating plates 51, which are pivotally connected at their outer ends to a disk 52 that is mounted to slide axially upon a sleeve 53 that slides on the sleeve 4. The movement of the disk 52 on the sleeve 53 is limited by a collar 54 on the outer end of the sleeve and by a flange 55 at the inner end of the sleeve. Movement may be imparted to the disk 52 by engagement of the collar 54 or flange 55 therewith when the sleeve 53 is shifted axially on the sleeve 4. The disk 46 is moved toward and away from the end of the drum by means of axially extending rods 56 attached to the disk and extending through the inner and outer walls of the housing 2 and pivotally connected to crank arms 57, attached to a horizontal shaft 58 mounted in brackets 59 attached to the outer wall of the housing 2. The sliding sleeve 53 is moved axially on the sleeve 4 by means of rods 60 attached to the collar 54, extending axially through the mechanism housing 2 and pivotally connected to crank arms 61 attached to a sleeve 62, rotatably mounted on the shaft 58.

The initial step in the building of a tire consists in applying a band of fabric composed of a plurality of plies to the periphery of the drum. The fabric is applied to the drum in the usual and conventional manner and the width of the fabric band so applied is greater than the length of the drum, so that the edges of the band project a substantial distance beyond each end of the drum. The projecting ends of the fabric are then folded in against the ends of the drum by means of the contractible rings 42, after which the bead ring is pressed against the fabric overlying the flange 39 of the drum, and is held in place by the attachment of a fabric flipper strip carried by the bead ring to the fabric on the periphery of the drum.

The shaft 58 and sleeve 62 are actuated at the proper time intervals by means of cams 63 and 64 rotatably mounted on the shaft 30 through connecting rods 65 and 66, the cams 63 and 64 being actuated from the shaft 15 through large Geneva gears 67 and 68 attached to the shaft 15 and small Geneva gears 69 and 70 attached to the cams.

As fully described in the parent application above referred to, the device of the present application is associated with a mechanism for folding the fabric about the bead ring and a mechanism for applying tread stock to a tire carcass on the drum as well as with the head applying mechanism above referred to. The mechanism for folding the fabric about a bead ring is indicated generally by the reference character G and the tread applying mechanism is indicated generally by the reference character H. The mechanism of the present invention is held in retracted contracted position shown in Fig. 1 during the operation of the fabric folding mechanism G and tread applying mechanism H.

The bead applying and fabric folding mechanisms are operated in the proper timed relation by the shaft 15 driven by the motor 19 which is controlled by a starting switch 72 and a suitable limit switch 73 which is engaged by suitable lugs 74 on a disk 75 attached to the shaft 15. The motor 8 is controlled to drive the drum A forwardly or rearwardly to facilitate application of the carcass fabric and tread stock by means of suitable pedals 76 and 77 at the front of the machine.

At the stage in the cycle of operations shown in Fig. 5, a fabric band D consisting of a plurality of plies of fabric has been applied to the periphery of the drum A, the band D being of a width to project a substantial distance beyond the ends of the drum, and a bead ring E with an attached flipper strip F has been mounted upon the seat 35 of the bead applying annulus 34. The disk 46 has been positioned between the annulus 34 and the end of the drum and the fabric folding ring 42 has been expanded from the position shown in dotted lines in Fig. 5 to the position shown in full lines, the expansion of the ring 42 having been effected by movement of the sleeve 53 and disk 52 from the dotted line position to the full line position in Fig. 5.

After the ring 42 has been expanded as shown in Fig. 5, the disk 46 is moved inwardly toward the drum A by means of the rods 56, to the position shown in Fig. 6. The sleeve 53 is held stationary in the position shown in Fig. 5 during the inward movement of the disk 46, and the disk 52 slides inwardly on the sleeve 53 to a position adjacent the flange 55 when the ring 42 is brought to the position shown in dotted lines in Fig. 6. The sleeve 53 is then moved outwardly to engage the flange 55 with the disk 52 and pull the links 47 and 48 of the toggle out of alignment so that the tension of the spring ring 42 snaps the ring to its contracted position shown in full lines in Fig. 6, moving the arms 43 radially inwardly, swinging the links 47 and 48 outwardly, and moving the disk 52 outwardly toward the collar 54 on the sleeve 53. The ring 42 is thus caused to snap inwardly against the exterior of the edge portion of the fabric band D, engaging the band simultaneously throughout the circumference thereof and folding the fabric inwardly over the end of the drum. It should be noted that in folding the fabric over the end of the drum, the engagement of the folding ring 42 with the fabric is entirely beyond the end of the drum, so that there is no pressure exerted through the fabric against the drum shoulder. When the edge portion of a cylindrical band of fabric is forced inwardly to form an inwardly extending flange, the fabric must wrinkle or shrink to compensate for the reduction in circumference. By engaging the fabric beyond the end of the drum simultaneously throughout its circumference within a uniformly contracting ring such as the ring 42, stresses are set up in the fabric tending to crowd the cords of the fabric together and the fabric overlying the drum shoulder and flange is free to uniformly accommodate and adjust itself to its contracted form so that wrinkling of the fabric overlying the bead positioning flange is avoided.

While the folding ring 42 remains in the position shown in Fig. 6 engaging the fabric flange and holding it against outward movement the connecting rods 28 are actuated to slide the bars 25 and annulus 24 axially toward the end of the drum. The bead carrying annulus 34 moves with the annulus 24 until the bead ring E is brought into engagement with the fabric overlying the flange 39 of the drum, whereupon the movement of the annulus 34 is stopped and the bead ring E is pressed against the fabric. Continued movement of the annulus 24 compresses the spring 38 and applies increasing pressure to the bead ring E.

As the ring 24 moves over the periphery of the drum the spring ring 40 is dragged over a flipper strip F attached to the bead ring E and presses the same against the fabric band D lying on the drum shoulder and upon the periphery of the drum adjacent the shoulder. After the flipper strip has been stitched down upon the fabric the annulus 24 is retracted and carries with it the bead applying annulus 34 to the position shown in Fig. 1.

In the retracted position the fabric folding mechanism of the present invention is spaced sufficiently from the end of the drum to permit actuation of the fabric folding mechanism G and being contracted to its smallest external diameter does not interfere with the tread applying mechanism H.

It is to be understood that variations and modifications of the specific devices herein shown and described for purposes of illustration, may be made without departing from the spirit of the invention.

What I claim is:

1. The herein described method of forming a fabric flange on a rubber coated fabric band carried by a tire building drum that comprises positioning the band on the drum with an end thereof projecting past an end of the drum, stretching an elastic band to a size larger than the fabric band, positioning said elastic band around the projecting end of said band, and releasing the stretched band to cause it to snap into engagement with the edge of the fabric band beyond the end of the drum to simultaneously bend all portions of the fabric throughout the circumference of the band inwardly over the end of the drum.

2. The herein described method of forming a fabric flange on a rubber coated fabric band carried by a tire building drum that comprises positioning the band on the drum with an end thereof projecting past an end of the drum, positioning an annular row of closely spaced fabric engaging elements around the projecting end of said band and wholly beyond the end of the drum, and simultaneously moving said engaging elements radially inwardly past the periphery of the drum along lines spaced from the end of the drum to contract the edge of the band throughout its circumference to provide an inwardly projecting flange overlying the end of the drum.

WALTER J. BRETH.

References Cited in the file of this patent

UNITED STATES PATENTS

| Number | Name | Date |
| --- | --- | --- |
| 2,313,035 | Breth | Mar. 9, 1943 |